(12) United States Patent
Chin et al.

(10) Patent No.: US 9,781,433 B2
(45) Date of Patent: Oct. 3, 2017

(54) SYSTEMS, METHODS, AND APPARATUS FOR REAL-TIME VIDEO ENCODING

(75) Inventors: Douglas Chin, Haverhill, MA (US); Nader Mohsenian, San Jose, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 2785 days.

(21) Appl. No.: 11/412,268

(22) Filed: Apr. 27, 2006

(65) Prior Publication Data

US 2006/0256869 A1 Nov. 16, 2006
US 2012/0243613 A9 Sep. 27, 2012

Related U.S. Application Data

(63) Continuation-in-part of application No. 11/043,575, filed on Jan. 26, 2005, now Pat. No. 8,548,044.

(60) Provisional application No. 60/681,307, filed on May 16, 2005.

(51) Int. Cl.
| H04N 7/12 | (2006.01) |
| H04N 11/02 | (2006.01) |
| H04N 11/04 | (2006.01) |
| H04N 19/152 | (2014.01) |
| H04N 19/172 | (2014.01) |
| H04N 19/149 | (2014.01) |
| H04N 19/115 | (2014.01) |
| H04N 19/61 | (2014.01) |
| H04N 19/124 | (2014.01) |

(52) U.S. Cl.
CPC ......... *H04N 19/152* (2014.11); *H04N 19/115* (2014.11); *H04N 19/124* (2014.11); *H04N 19/149* (2014.11); *H04N 19/172* (2014.11); *H04N 19/61* (2014.11)

(58) Field of Classification Search
CPC .......................... H04N 19/146; H04N 19/149
USPC .................................................... 375/240.01
See application file for complete search history.

(56) References Cited

U.S. PATENT DOCUMENTS

| 5,283,646 A * | 2/1994 | Bruder ...................... 375/240.12 |
| 5,847,766 A * | 12/1998 | Peak .................... H04N 19/159 |
| | | 375/240.24 |
| 5,956,426 A * | 9/1999 | Matsuura .................. G06T 9/00 |
| | | 348/388.1 |
| 5,990,957 A * | 11/1999 | Ryoo ........................ 375/240.03 |
| 6,278,735 B1 * | 8/2001 | Mohsenian .......... H04N 19/176 |
| | | 375/240 |
| 2006/0062292 A1* | 3/2006 | Boice .................... H04N 19/172 |
| | | 375/240.01 |
| 2006/0114989 A1* | 6/2006 | Panda ...................... 375/240.03 |

(Continued)

*Primary Examiner* — Jeremaiah C Hallenbeck-Huber
(74) *Attorney, Agent, or Firm* — McDermott Will & Emery LLP

(57) ABSTRACT

Presented herein are systems, methods, and apparatus for real-time high definition television encoding. In one embodiment, there is presented a method for encoding video data. The method comprises receiving an estimates of amounts of data for encoding earlier pictures; providing target rates based on the estimates of data for encoding the earlier pictures; receiving measures indicative of the actual data for encoding the earlier pictures; and providing at least one target rate for encoding at least one later picture based on the target rates for encoding the earlier pictures and the measures indicative of the actual data for encoding the earlier pictures.

18 Claims, 6 Drawing Sheets

(56) References Cited

U.S. PATENT DOCUMENTS

2006/0165165 A1* 7/2006 Mohsenian ............. 375/240.03

* cited by examiner

SYSTEMS, METHODS, AND APPARATUS FOR REAL-TIME VIDEO ENCODING

RELATED APPLICATIONS

This application is a continuation-in-part and claims priority to U.S. application Ser. No. 11/043,575 filed Jan. 26, 2005, now issued as U.S. Pat. No. 8,548,044.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Advanced Video Coding (AVC) (also referred to as H.264 and MPEG-4, Part 10) can be used to compress video content for transmission and storage, thereby saving bandwidth and memory. However, encoding in accordance with AVC can be computationally intense.

In certain applications, for example, live broadcasts, it is desirable to compress high definition television content in accordance with AVC in real time. However, the computationally intense nature of AVC operations in real time may exhaust the processing capabilities of certain processors. Parallel processing may be used to achieve real time AVC encoding, where the AVC operations are divided and distributed to multiple instances of hardware which perform the distributed AVC operations, simultaneously.

Ideally, the throughput can be multiplied by the number of instances of the hardware. However, in cases where a first operation is dependent on the results of a second operation, the first operation may not be executable simultaneously with the second operation. In contrast, the performance of the first operation may have to wait for completion of the second operation.

AVC uses temporal coding to compress video data. Temporal coding divides a picture into blocks and encodes the blocks using similar blocks from other pictures, known as reference pictures. To achieve the foregoing, the encoder searches the reference picture for a similar block. This is known as motion estimation. At the decoder, the block is reconstructed from the reference picture. However, the decoder uses a reconstructed reference picture. The reconstructed reference picture is different, albeit imperceptibly, from the original reference picture. Therefore, the encoder uses encoded and reconstructed reference pictures for motion estimation.

Using encoded and reconstructed reference pictures for motion estimation causes encoding of a picture to be dependent on the encoding of the reference pictures. This can be disadvantageous for parallel processing.

Additional limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Presented herein are systems, methods, and apparatus for encoding video data in real time, substantially as shown in and/or described in connection with at least one of the figures, as set forth more completely in the claims.

These and other advantages and novel features of the present invention, as well as illustrated embodiments thereof will be more fully understood from the following description and drawings.

DETAILED DESCRIPTION OF THE INVENTION

Figure 1:
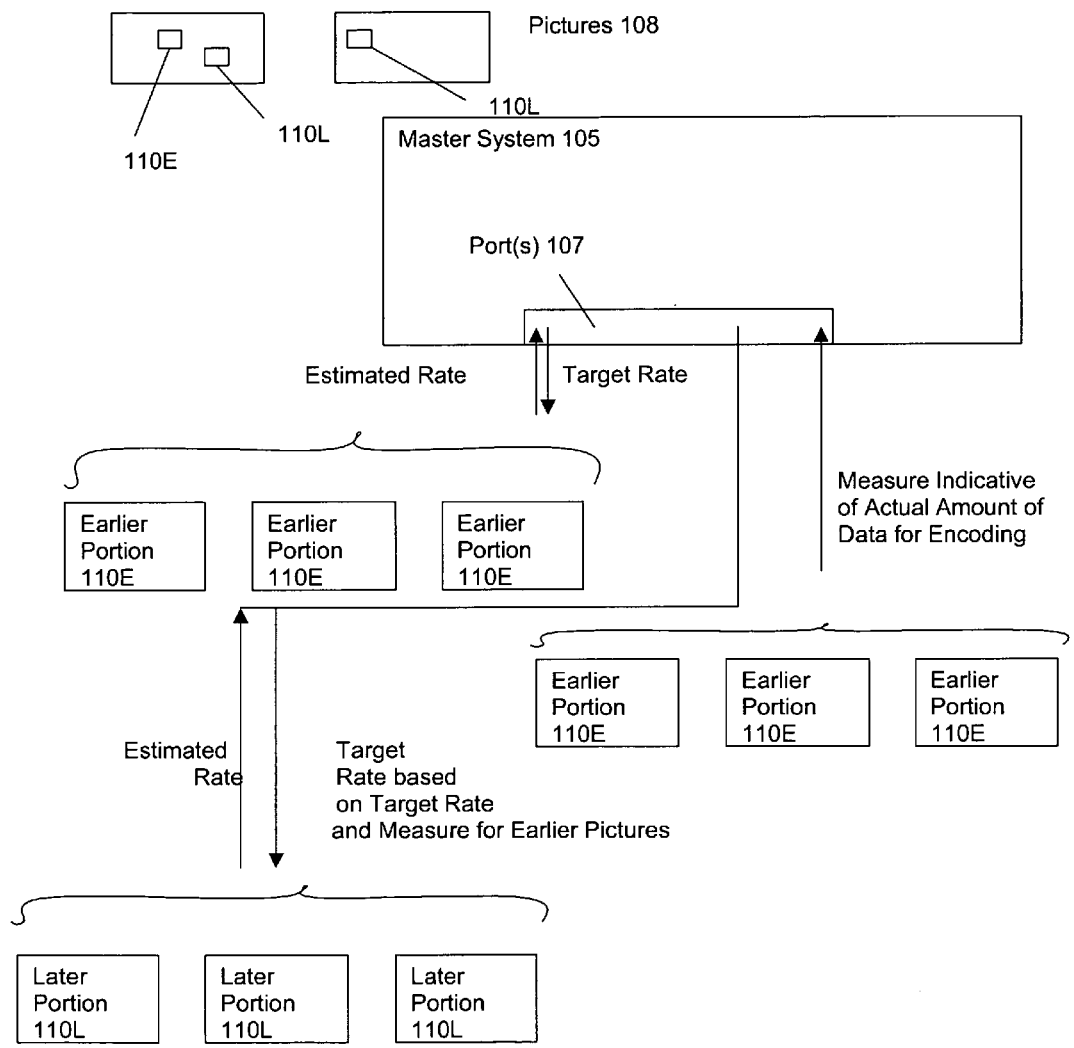
FIG. 1 is a block diagram of an exemplary master system for encoding video data in accordance with an embodiment of the present invention.

Referring now to FIG. 1, there is illustrated a block diagram of an exemplary master system 105 for encoding video data in accordance with an embodiment of the present invention. The master system 105 includes at least one port 107.

The video data include a picture 108. The picture 108 comprises earlier portions 11E, and later portions 110L. The earlier portions 110E are encoded earlier than the later portions 110L. The at least one port 110 receives an estimated amount of data for encoding the earlier portions 110E. The estimated amount of data can be an estimate of the amount of data for encoding the earlier portions 110E, based on certain parameters, such as lossy compression parameters. The lossy compression parameters can include, for example, the quantization step size.

The amount of data for encoding the earlier portions 110E can be estimated in a variety of ways. According to certain embodiments of the invention, the amount of data for encoding the picture can be estimated in the manner described in "Systems, Methods, and Apparatus for Real-Time High Definition Encoding", U.S. Application for Patent Ser. No. 60/681,268, filed May 16, 2005, which is incorporated herein by reference for all purposes. Alternatively, the amount of data for encoding the picture can be estimated in the manner described in "System and Method for Open Loop Spatial Prediction in a Video Encoder", U.S. Application for Patent Ser. No. 60/681,642, filed May 17, 2005, which is incorporated herein by reference for all purposes.

The estimates of the amount of data for encoding the earlier portions 110E can come from a variety of sources. For example, in certain embodiments of the present invention, the estimates can come from an encoder, or plurality of encoders. The plurality of encoders can operate in parallel. Alternatively, the master 105, itself, can provide the estimate of the amount of data for encoding the earlier pictures.

The master 105, via the at least one port 107 provides target rates for the earlier portions 110E. The target rates can be an amounts of data budgeted for encoding the earlier portions 110E. The earlier portions 110E can then be encoded in a variety of ways.

The earlier portions 110E and later portions 110L can be portions of the same picture or different pictures, wherein the earlier portion 110E is a portion of an earlier encoded picture and wherein the later portion 110L is a portion of a later encoded picture.

Certain encoding standards such as Advanced Video Coding (AVC), VC-1, and MPEG-2 use a combination of lossy and lossless compression for encoding video data. In lossless compression, information from the video data is not lost from the compression. However, in lossy compression, some information from the video data is lost to improve compression. An example of lossy compression is the quantization of transform coefficients.

Lossy compression involves trade-off between quality and compression. Generally, the more information that is lost during lossy compression, the better the compression rate, but, the more the likelihood that the information loss perceptually changes the video data 102 and reduces quality. One example of lossy compression is the quantization of transform coefficients.

In certain embodiments of the present invention, the target rates can be used for controlling the lossy compression of the earlier portions 110E. For example, the lossy compression can be controlled by controlling a quantization step size used for quantizing transform coefficients.

The at least one port 107 receives an indicator indicating the actual amount of data used to encode the earlier portions 110E. The indicator indicating the actual amount of data for encoding the picture can comprise, for example, an actual bit count of the data encoding the picture, or a measure of the data encoding the picture after certain intermediate stages of the encoding. In certain embodiments of the present invention, the indicator indicating the amount of data can be an estimate of the amount of data for encoding the picture based on a measure of the data encoding the picture after certain intermediate stages of the encoding.

The indicator indicating the actual amount of data used to encode the earlier portions 110E can be compared to the target rate provided for encoding the earlier portions 110E. Where the indicator indicates that the actual amount of data for encoding the picture is different from the target rate beyond a certain threshold, the target rates for later portions 110L, as a function of the estimated amount of data for encoding the later pictures 110L can be adjusted.

Accordingly, the at least one port 107 provides at least one target rate for encoding at least one later portion 110L that is based on the target rates for encoding the earlier pictures and the measures indicative of the actual data for encoding the earlier pictures.

Figure 2:
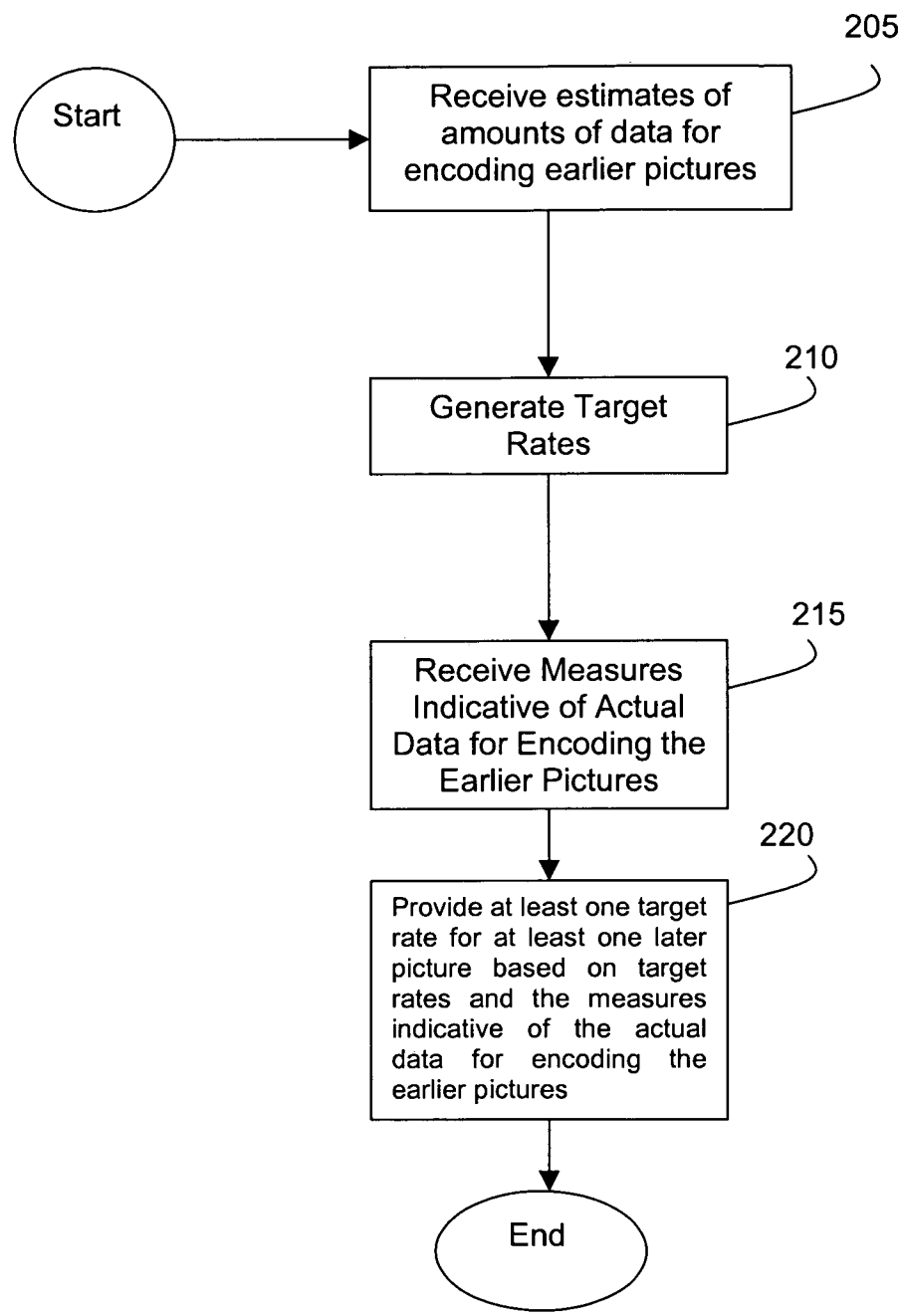
FIG. 2 is a flow diagram for encoding video data in accordance with an embodiment of the present invention.

Referring now to FIG. 2, there is illustrated a flow diagram for encoding video data in accordance with an embodiment of the present invention. At 205, estimates of amounts of data for encoding earlier portions are received. At 210 target rates based on the estimates of data for encoding the earlier portions are provided. At 215, measures indicative of the actual data for encoding the earlier portions are received. At 220, at least one target rate for encoding at least one later portion based on the target rates for encoding the earlier portion and the measures indicative of the actual data for encoding the earlier portion, is provided.

Advanced Video Coding (AVC) (also referred to as H.264 and MPEG-4, Part 10) can be used to compress video content for transmission and storage, thereby saving bandwidth and memory. However, encoding in accordance with AVC can be computationally intense.

In certain applications, for example, live broadcasts, it is desirable to compress high definition television content in accordance with AVC in real time. However, the computationally intense nature of AVC operations in real time may exhaust the processing capabilities of certain processors. Parallel processing may be used to achieve real time AVC encoding, where the AVC operations are divided and distributed to multiple instances of hardware that perform the distributed AVC operations, simultaneously.

Figure 3:
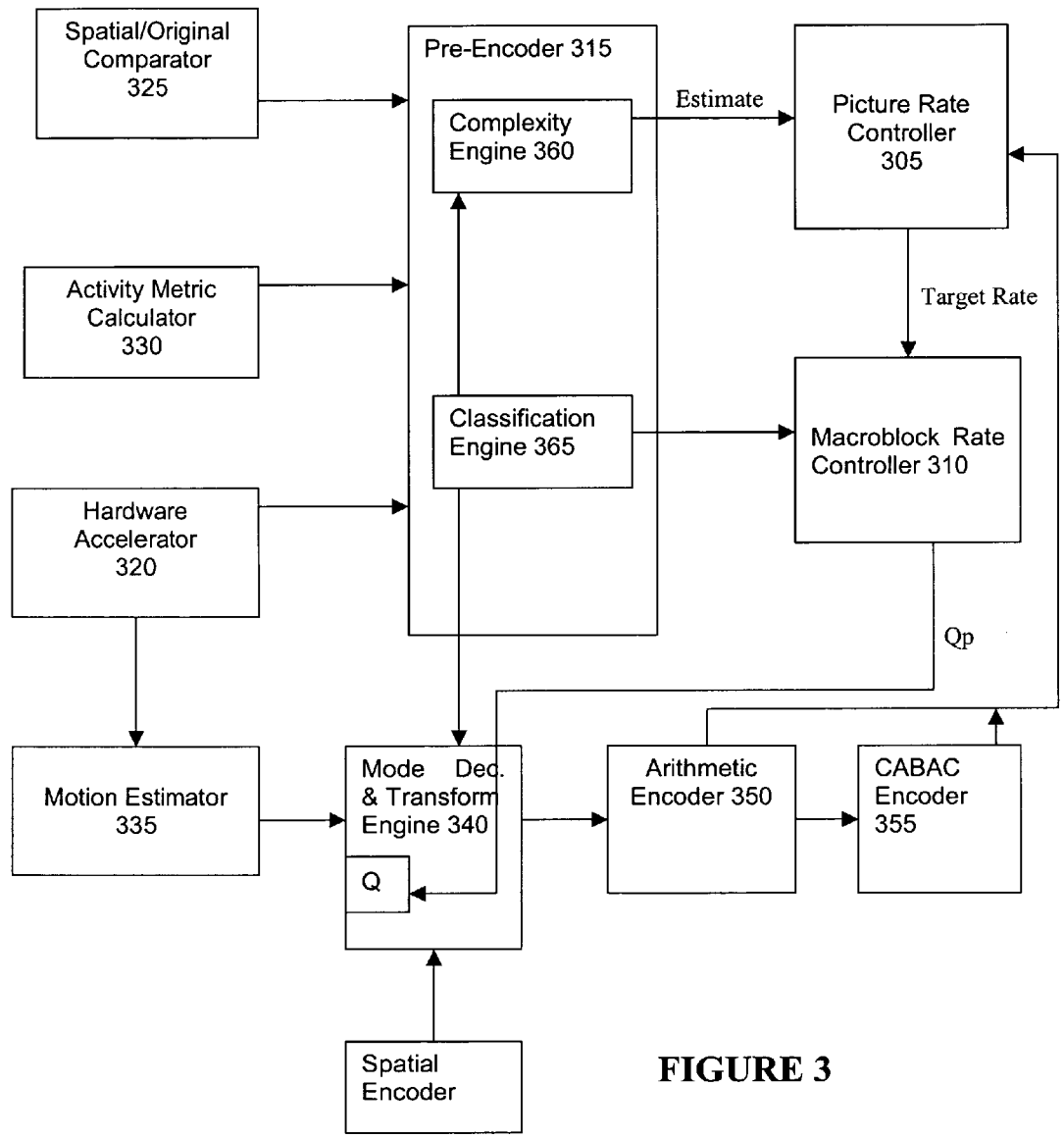
FIG. 3 is a block diagram of a system for encoding video data in parallel, in accordance with an embodiment of the present invention.

Referring now to FIG. 3, there is illustrated a block diagram of an exemplary system for encoding video data in parallel, in accordance with an embodiment of the present invention. The system comprises a picture rate controller 305, a macroblock rate controller 310, a pre-encoder 315, hardware accelerator 320, spatial from original comparator 325, an activity metric calculator 330, a motion estimator 335, a mode decision and transform engine 340, an arithmetic encoder 350, and a CABAC encoder 355.

The picture rate controller 305 can comprise software or firmware residing on the master 105. The macroblock rate controller 310, pre-encoder 315, spatial from original comparator 325, mode decision and transform engine 340, spatial predictor 345, arithmetic encoder 350, and CABAC encoder 355 can comprise software or firmware residing on any number of encoders 302. The pre-encoder 315 includes a complexity engine 360 and a classification engine 365. The hardware accelerator 320 can either be a central resource accessible by each of the encoders 302, or decentralized hardware at the encoders 302.

The hardware accelerator 320 searches original reference pictures for blocks that are similar to blocks in the earlier portion 110E. The hardware accelerator 320 can comprise and/or operate substantially like the hardware accelerator described in "Systems, Methods, and Apparatus for Real-Time High Definition Encoding", U.S. Application for Patent Ser. No. 60/681,268, filed May 16, 2005, by Chin, which is incorporated herein by reference for all purposes.

The spatial from original comparator 325 examines the quality of the spatial prediction of blocks in the earlier pictures 110E, using the original earlier pictures 110E. The spatial from original comparator 325 can comprise and/or operate substantially like the spatial from original comparator 325 described in "System and Method for Open Loop Spatial Prediction in A Video Encoder", U.S. Application for Patent Ser. No. 60/681,642, filed May 17, 2005, by Chin, which is incorporated herein by reference for all purposes.

The pre-encoder 315 comprises a complexity engine 360 that estimates the amount of data of data for encoding the earlier pictures 11E, based on the results of the hardware accelerator 320 and the spatial from original comparator 325. The pre-encoder 315 also comprises a classification engine 365. The classification engine 365 classifies certain content from the earlier pictures 110E that is perceptually sensitive, such as human faces, where additional data for encoding is desirable.

Where the classification engine 365 classifies certain content from the earlier pictures 110E to be perceptually sensitive, the classification engine 365 indicates the foregoing to the complexity engine 360. The complexity engine 360 can adjust the estimate of data for encoding the earlier pictures 110E. The complexity engine 365 provides the estimate of the amount of data for encoding the pictures by providing an amount of data for encoding the picture with a nominal quantization parameter Qp. It is noted that the nominal quantization parameter Qp is not necessarily the quantization parameter used for encoding the earlier pictures 110E.

The picture rate controller 305 provides target rates for the earlier pictures to the macroblock rate controller 310. The motion estimator 335 performs the motion estimation while the spatial predictor 345 performs the spatial predictions. The mode decision & transform engine 340 determines whether to use spatial encoding or temporal encoding, and calculates, transforms, and quantizes the prediction error E from the reference block.

The complexity engine 360 indicates the complexity of each macroblock 320 at the macroblock level based on the results from the hardware accelerator 320, while the classification engine 365 indicates whether a particular macroblock contains sensitive content. Based on the foregoing, the complexity engine 360 provides an estimate of the amount of bits that would be required to encode the macroblock 320. The macroblock rate controller 310 determines a quantization parameter and provides the quantization parameter to the mode decision & transform engine 340. The mode decision & transform engine 340 comprises a quantizer Q. The quantizer Q uses the foregoing quantization parameter to quantize the transformed prediction error.

The mode decision & transform engine 340 provides the transformed and quantized prediction error E to the arithmetic encoder 350. The arithmetic encoder 350 codes the quantized prediction error into BINS. The BINS measure can be measures that are indicative of the actual amounts of data for encoding the earlier pictures. Accordingly, the picture rate controller 305 receives the number of BINS that encoded the earlier pictures 110E.

In certain embodiments of the present invention, the macroblock rate controller 310 can estimate an amount of bits for encoding the earlier macroblocks 110E of pictures, such as macroblocks. Additionally, the macroblock rate controller 310 can maintain statistics from earlier macroblocks 110E, such as the target rate given and the estimated bits for encoding the earlier macroblocks 110E, the target rates for encoding the earlier macroblocks 110E, and the estimated amount of bits for encoding the earlier macroblocks 110E from the count of BINs.

The picture rate controller 305 can use the foregoing as feedback. For example, if the target rate is exceeded beyond a certain threshold for earlier pictures that are a certain type of pictures, such as B-pictures, P-pictures, or I-pictures, in a particular group of pictures, the picture rate controller 305 can bias the target rate lower for later pictures that are the certain type in the particular group of pictures. Similarly, if the target rate exceeds the estimate bits for encoding the earlier pictures that are a certain type from the BINs count, the picture rate controller 305 can bias the target rate higher for later pictures that are the certain type.

The CABAC encoder 355 converts the bins to CABAC encoded data. In certain embodiments of the present invention, the picture rate controller 305 can also receive the count of bits for encoding the earlier pictures 110E. The counts of bits can be used to adjust the estimate of the bits from the BINs count. For example, the picture rate controller 305 can store the estimated amount of bits from the BINs count for comparison to the actual bit count for encoding the earlier pictures 110E. Where the actual bit count for encoding the earlier pictures 110E is outside the estimated amount of bits from the BINs count, the estimate of bits from the BINs count of later pictures can be adjusted. Thus in certain embodiments of the present invention, the estimate of bits for encoding later pictures 110L can be also be based on the comparison of the count of bits for encoding the earlier pictures to the estimated amount of bits from the count of BINs for the earlier pictures.

Figure 4:
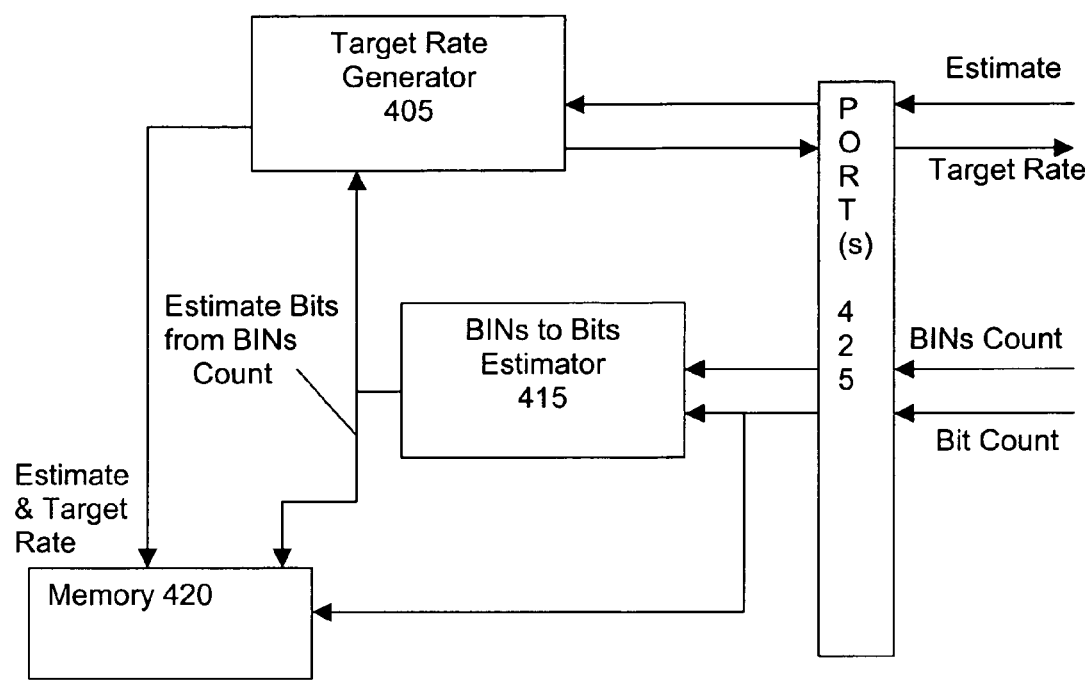
FIG. 4 is a block diagram describing a rate controller system in accordance with an embodiment of the present invention.

Referring now to FIG. 4, there is illustrated a block diagram of the macroblock rate controller 310. The macroblock rate controller 310 comprises a target rate generator 405, a target rate bias, and BINs to bits estimator 415, memory 420, and a port 425.

The target rate generator 405 receives estimates of amounts of data for encoding earlier macroblocks 110E, and provides target rates based on the estimates of data for encoding the earlier macroblocks 110E. The memory 420 stores the estimates of the amounts of data for encoding the earlier macroblocks 110E, and the target rate given by the target rate generator 405.

The BINs to bits estimator 415 receives the count of BINs for encoding the earlier macroblocks 110E from the arithmetic encoder 350 via port 425, and estimates an amount of bits from the count of BINS of the actual data for encoding the earlier macroblocks 110E. The memory 420 stores the BINs count and the estimated amount of bits from the count of BINs.

The BINs to bits estimator 415 provides the estimate of bits from the BINs count to the target rate generator 405. The target rate generator 405 compares the estimated bits from the BINs count to the target rate. If the estimated bits from the BINs count is beyond a predetermined margin of error from the target rate, the target rate generator 405 appropriately biases the target rate for later macroblocks 110L. Accordingly, the target rate generator 405 provides target rates via port 425 for encoding later macroblocks 110L that are also based on the target rates for encoding the earlier macroblocks 110E, and the estimated amount of data for encoding the earlier macroblocks 110E based on the BINs count.

The BINs to bits estimator 415 receives the actual bit count from the CABAC encoder 355 via port 425. The BINs to bits estimator 415 compares the actual bit count for encoding the earlier pictures 110E from the CABAC encoder 355 to the estimated bit count from the BINs count for the earlier macroblocks 110E. If the actual bit count for encoding the earlier macroblocks 110E varies from the CABAC encoder 355 varies from the estimated bit count from the BINs count for the earlier macroblocks 110E beyond a predetermined margin of error, the bit rate estimator 415 appropriately biases the estimated amount of bits from the count of BINs for the later macroblocks 110L.

Thus, when the BINs to bits estimator 415 receives a count of BINs for encoding later macroblocks 110L, via port 425, the BINs to bits estimator 415 estimates an amount of bits from the count of BINS for encoding the later macroblocks 110L, based on the comparison of the count of bits for encoding the earlier macroblocks 110E to the estimated amount of bits from the count of BINs for the earlier macroblocks 110E.

The biasing at the target rate generator 405 and the BINs to bits estimator 415 can be selective for certain types of pictures, such as for I-pictures, P-pictures, or B-pictures in a particular group of pictures.

Figure 5:
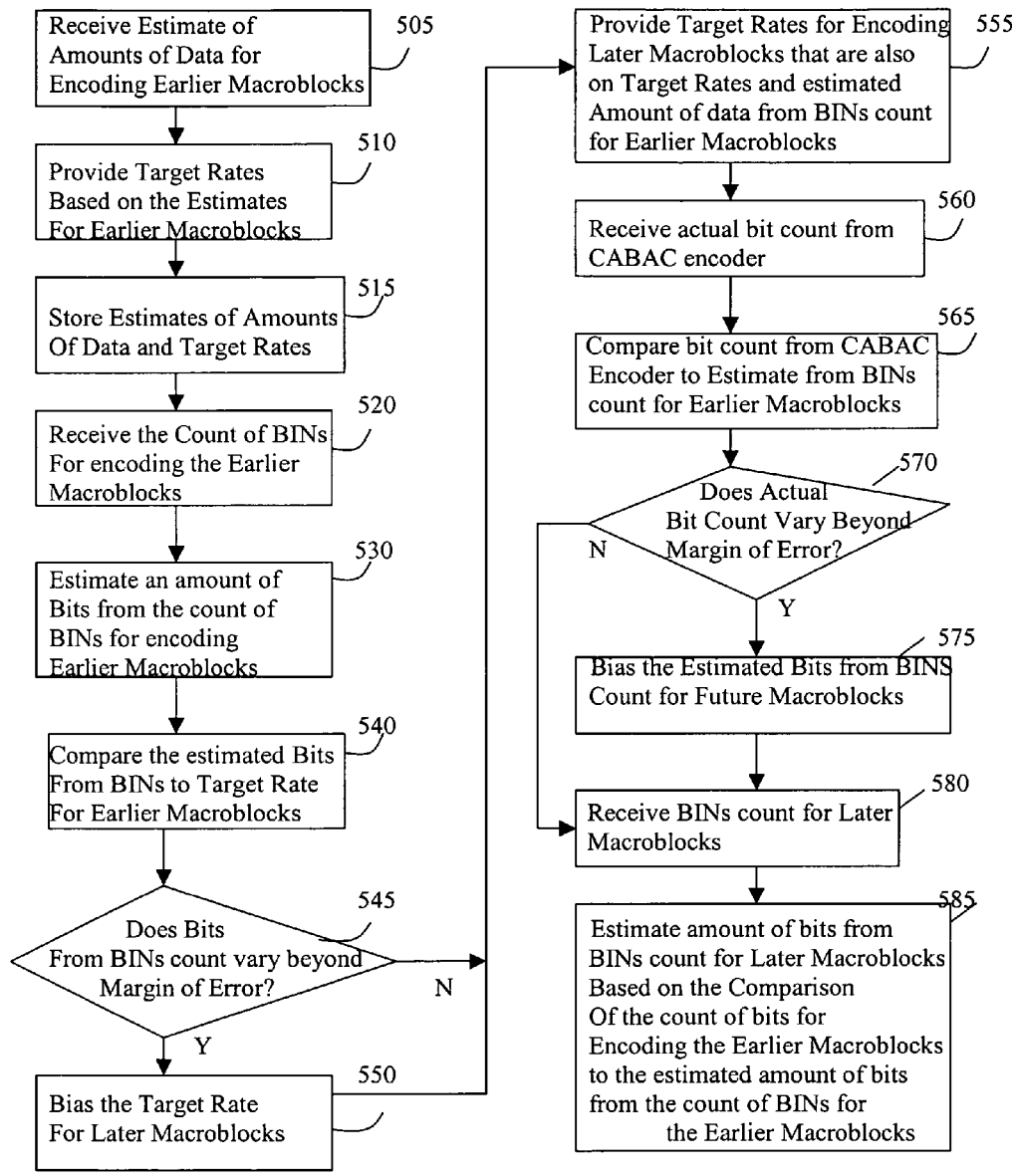
FIG. 5 is a flow diagram for encoding video data in accordance with another embodiment of the present invention.

Referring now to FIG. 5, there is illustrated a flow diagram for controlling the rate of video data encoding. At 505, the target rate generator 405 receives estimates of amounts of data for encoding earlier macroblocks 110E, and provides (at 510) target rates based on the estimates of data for encoding the earlier macroblocks 110E. The memory 420 stores (at 515) the estimates of the amounts of data for encoding the earlier macroblocks 110E, and the target rate given by the target rate generator 405.

The BINs to bits estimator 415 receives the count of BINs for encoding the earlier macroblocks 110E from the arithmetic encoder 350 via port 425 at 520, and estimates (at 530) an amount of bits from the count of BINS of the actual data for encoding the earlier macroblocks 110E. At 535, the memory 420 stores the BINs count and the estimated amount of bits from the count of BINs.

The BINs to bits estimator 415 provides (at 535) the estimate of bits from the BINs count to the target rate generator 405. The target rate generator 405 compares (at 540) the estimated bits from the BINs count to the target rate. If at 545, the estimated bits from the BINs count is beyond a predetermined margin of error from the target rate, the target rate generator 405 appropriately biases (at 550) the target rate for later macroblocks 110L. If at 545, the estimated bits form the BINs count is beyond the predetermined margin of error, 550 is bypassed. At 555, the target rate generator 405 provides target rates via port 425 for encoding later macroblocks 110L that are also based on the target rates for encoding the earlier macroblocks 110E, and the estimated amount of data for encoding the earlier macroblocks 110E based on the BINs count.

At 560, the BINs to bits estimator 415 receives the actual bit count from the CABAC encoder 355 via port 425. The BINs to bits estimator 415 compares (at 565) the actual bit count for encoding the earlier macroblocks 110E from the CABAC encoder 355 to the estimated bit count from the BINs count for the earlier macroblocks 110E. If at 570, the actual bit count for encoding the earlier macroblocks 110E varies from the CABAC encoder 355 varies from the estimated bit count from the BINs count for the earlier macroblocks 110E beyond a predetermined margin of error, the bit rate estimator 415 appropriately biases (at 575) the estimated amount of bits from the count of BINs for the later macroblocks 110L.

At 580, the BINs to bits estimator 415 receives a count of BINS for encoding later macroblocks 110L, via port 425, the BINs to bits estimator 415, and estimates (at 585) an amount of bits from the count of BINS for encoding the later macroblocks 110L, based on the comparison of the count of bits for encoding the earlier macroblocks 110E to the estimated amount of bits from the count of BINS for the earlier macroblocks 110E.

Figure 6:
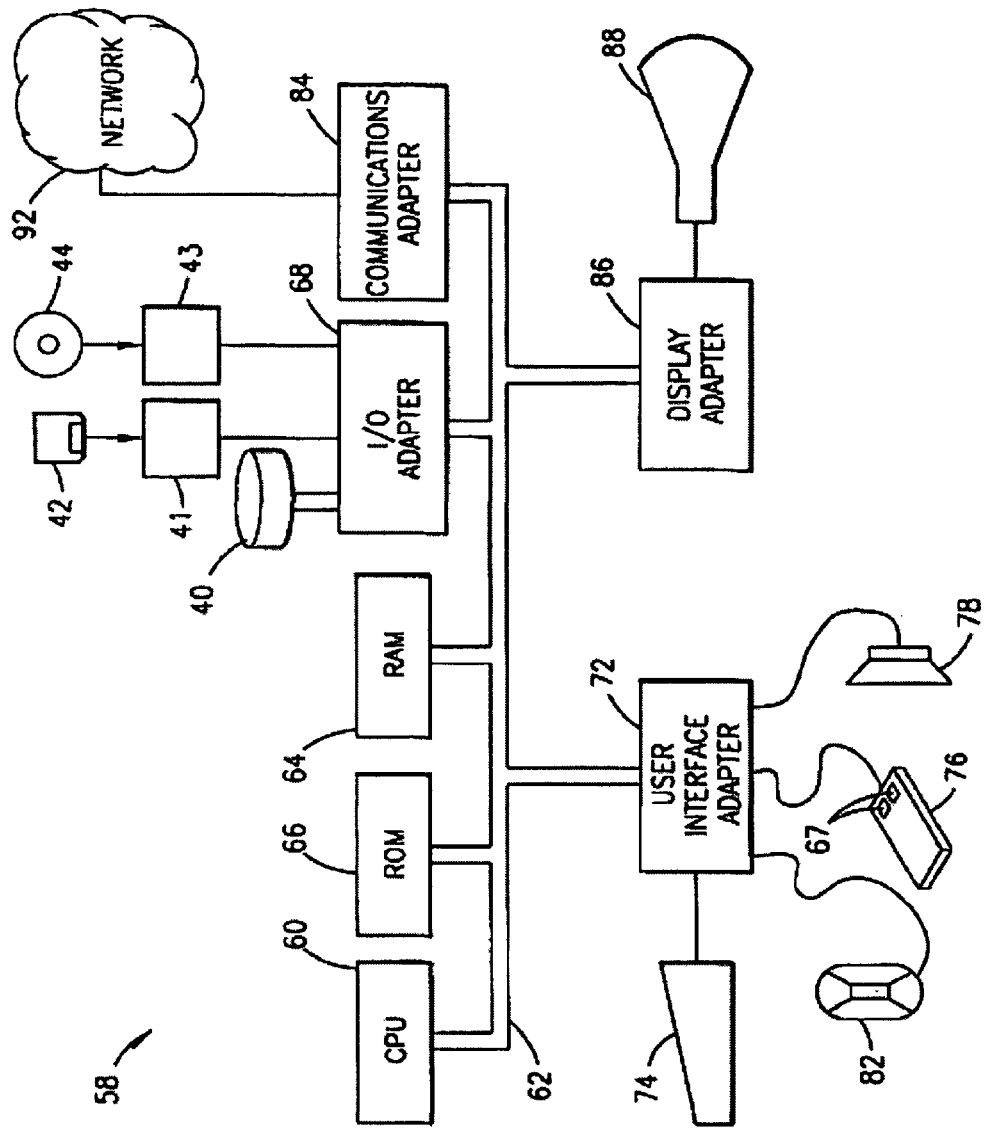
FIG. 6 is a block diagram describing an exemplary computer system configured in accordance with an embodiment of the present invention.

Referring now to FIG. 6, there is illustrated a block diagram of an exemplary computer system configured in accordance with an embodiment of the present invention. A CPU 60 is interconnected via system bus 62 to random access memory (RAM) 64, read only memory (ROM) 66, an input/output (I/O) adapter 68, a user interface adapter 72, a communications adapter 84, and a display adapter 86. The input/output (I/O) adapter 68 connects peripheral devices such as hard disc drives 40, floppy disc drives 41 for reading removable floppy discs 42, and optical disc drives 43 for reading removable optical disc 44 (such as a compact disc or a digital versatile disc) to the bus 62. The user interface adapter 72 connects devices such as a keyboard 74, a mouse 76 having a plurality of buttons 67, a speaker 78, a microphone 82, and/or other user interfaces devices such as a touch screen device (not shown) to the bus 62. The communications adapter 84 connects the computer system to a data processing network 92. The display adapter 86 connects a monitor 88 to the bus 62.

An embodiment of the present invention can be implemented as sets of instructions resident in the random access memory 64 of one or more computer systems configured generally as described in FIG. 6. For example, the flow chart of FIGS. 2 and 5 can be implemented as sets of instructions in a computer system. Additionally, the systems described in FIG. 4 can also be implemented as sets of instructions in a computer system. Until required by the computer system 58, the set of instructions may be stored in another computer readable memory, for example in a hard disc drive 40, or in removable memory such as an optical disc 44 for eventual use in an optical disc drive 43, or a floppy disc 42 for eventual use in a floppy disc drive 41. The physical storage of the sets of instructions physically changes the medium upon which it is stored electrically, magnetically, or chemically so that the medium carries computer readable information.

The embodiments described herein may also be implemented as a board level product, as a single chip, an application specific integrated circuit (ASIC), or with varying levels of the decoder system integrated with other portions of the system as separate components.

The degree of integration of the decoder system may primarily be determined by the speed and cost considerations. Because of the sophisticated nature of modern processor, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware. Alternatively, the foregoing can be implemented as hardware accelerator units controlled by the processor.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with a particular emphasis on the AVC encoding standard, the invention can be applied to a video data encoded with a wide variety of standards.

Therefore, it is intended that the present invention not be limited to the particular embodiment disclosed, but that the present invention will include all embodiments falling within the scope of the appended claims.

The invention claimed is:

1. A method for encoding video data, said method comprising:
   receiving, from a plurality of encoders, at least one estimated amount of data for encoding at least one earlier portion of a frame;
   providing at least one target rate based on the at least one estimated amount of data for encoding the at least one earlier portion of the frame;
   receiving at least one measure indicative of actual data for encoding the at least one earlier portion of the frame;
   determining a type of at least one later portion of the frame;
   biasing the at least one target rate for the at least one later portion of the frame in response to the at least one earlier portion of the frame being determined to be of a certain type and the at least one target rate being exceeded by a threshold amount for the at least one earlier portion of the certain type; and providing at least one target rate for encoding the at least one later portion of the frame based on the at least one target rate for encoding the at least one earlier portion of the frame and the at least one measure indicative of the actual data for encoding the at least one earlier portion of the frame.

2. The method of claim 1, wherein receiving the at least one measure further comprises:
receiving a count of BINs for encoding the at least one earlier portion.

3. The method of claim 2, further comprising:
estimating an amount of bits from the count of BINS.

4. The method of claim 3, further comprising:
receiving a count of bits for encoding the at least one earlier portion; and
comparing the count of bits for encoding the at least one earlier portion to the amount of bits from the count of BINS for the at least one earlier portion.

5. The method of claim 4, further comprising:
receiving a count of BINs for encoding the at least one later portion; and
estimating an amount of bits from the count of BINs for encoding the at least one later portion, based on the comparing of the count of bits for encoding the at least one earlier portion to the amount of bits from the count of BINs for the at least one earlier portion.

6. The method of claim 1, wherein the plurality of encoders process the video data in parallel.

7. The method of claim 1, further comprising biasing the target rate for later portions that are a certain picture type in response to the target rate being exceeded by a threshold amount for earlier portions of the certain picture type.

8. The method of claim 3, further comprising biasing the target rate for later portions that are a certain picture type in response to the target rate exceeding the amount of bits for encoding the earlier portions of the certain type from the count of BINs.

9. A master server for encoding video data, said master server comprising:
at least one port for receiving, from a plurality of encoders, estimates of amounts of data for encoding earlier portions of a frame, providing target rates for the earlier portions, receiving indications of actual data for encoding the earlier portions, and at least one processor configured to determine a type of a first and second portion of at least one later portion of the frame, bias a first target rate in a first direction for the first portion in response to the first portion being determined to be a first type and the first target rate being exceeded by a threshold amount for earlier portions of the first type, and bias a second target rate in a second direction for the second portion in response to the second portion being determined to be a second type and the second target rate being exceeded by a threshold amount for earlier portions of the second type.

10. The master server of claim 9, wherein receiving indications of the actual data for encoding the earlier portions further comprises:
receiving a count of BINs for encoding the earlier portions.

11. The master server of claim 10, further comprising:
a first memory for configured to store a plurality of instructions for estimating an amount of bits from the count of BINs.

12. The master server of claim 11, wherein the at least one port receives a count of bits for encoding the earlier portions and wherein execution of the plurality of instructions causes comparing the count of bits for encoding the earlier portions to the amount of bits from the count of BINs for the earlier portions.

13. The master server of claim 12, wherein the at least one port receives a count of BINs for encoding the at least one later portion; and
wherein execution of the plurality of instructions causes estimating an amount of bits from the count of BINs for encoding the at least one later portion, based on the comparing of the count of bits for encoding the earlier portions to the amount of bits from the count of BINs for the earlier portions.

14. The master server of claim 13, further comprising:
a second memory configured to store estimated rates and the target rates.

15. The master server of claim 10, further comprising an encoder configured to code quantized prediction errors for the earlier portions into the BINs.

16. An apparatus comprising:
at least one port configured to:
receive estimates of amounts of data for encoding earlier portions of a frame, the estimates being determined based on counts of bins of bin strings used to encode the earlier portions of the frame;
provide target rates for the earlier portions;
receive indications of actual amounts of data for encoding the earlier portions; and
provide at least one target rate for encoding at least one later portion of the frame the at least one target rate being determined based on the target rates for encoding the earlier portions and the indications of the actual amounts of data for encoding the earlier portions; and
at least one processor configured to:
bias an estimate of an amount of data for encoding the at least one later portion in response to a determination that the estimate of the amount of data for encoding at least one earlier portion of the frame differs from the actual amount of data for encoding the at least one earlier portion of the frame by a threshold amount, the estimate of the amount of data for encoding the at least one later portion of the frame being determined from a count of bins of a bin string used to encode the at least one later portion.

17. The apparatus of claim 16, further comprising:
a first memory operably coupled to the port and configured to store plurality of instructions for determining respective estimates of amounts of bits from the respective counts of bins of the respective bin strings.

18. The apparatus of claim 16, wherein at least one of the estimates of the amounts of data for encoding at least one of the earlier portions is received from a plurality of encoders.

* * * * *

UNITED STATES PATENT AND TRADEMARK OFFICE
CERTIFICATE OF CORRECTION

PATENT NO. : 9,781,433 B2  
APPLICATION NO. : 11/412268  
DATED : October 3, 2017  
INVENTOR(S) : Douglas Chin and Nader Mohsenian Page 1 of 1

It is certified that error appears in the above-identified patent and that said Letters Patent is hereby corrected as shown below:

In the Claims

Claim 11, Column 10, Line 2, "memory for configured to" should read --memory configured to--.

Claim 16, Column 10, Line 36, "the frame the" should read --the frame, the--.

Claim 17, Column 10, Line 54, "to store plurality" should read --to store a plurality--.

Signed and Sealed this  
First Day of October, 2019

Andrei Iancu  
*Director of the United States Patent and Trademark Office*